United States Patent
Kobayashi et al.

(10) Patent No.: US 11,692,639 B2
(45) Date of Patent: Jul. 4, 2023

(54) VALVE DEVICE

(71) Applicant: Tokyo Electron Limited, Tokyo (JP)

(72) Inventors: Kei Kobayashi, Miyagi (JP); Takehiko Arita, Miyagi (JP)

(73) Assignee: TOKYO ELECTRON LIMITED, Tokyo (JP)

(*) Notice: Subject to any disclaimer, the term of this patent is extended or adjusted under 35 U.S.C. 154(b) by 0 days.

(21) Appl. No.: 17/183,468

(22) Filed: Feb. 24, 2021

(65) Prior Publication Data

US 2021/0262583 A1 Aug. 26, 2021

(30) Foreign Application Priority Data

Feb. 25, 2020 (JP) ................................ 2020-029078

(51) Int. Cl.
*F16K 31/122* (2006.01)

(52) U.S. Cl.
CPC ...... *F16K 31/122* (2013.01); *F15B 2211/40507* (2013.01); *F16K 31/1221* (2013.01)

(58) Field of Classification Search
CPC ...... F16K 1/52; F16K 31/122; F16K 31/1221; F16K 47/01; F16K 31/12; F16K 31/124; F16K 31/1245; F15B 2211/40507
USPC .......................... 251/62, 36, 48, 52, 63, 63.5
See application file for complete search history.

(56) References Cited

U.S. PATENT DOCUMENTS

| | | | | |
|---|---|---|---|---|
| 3,191,621 A * | 6/1965 | McKinnon | ............ | F16K 31/122 137/553 |
| 4,007,906 A * | 2/1977 | Karpenko | ............. | F16B 37/043 251/26 |
| 4,552,330 A * | 11/1985 | Grotloh | ................... | F01D 21/20 251/30.01 |
| 4,934,652 A * | 6/1990 | Golden | ................... | E21B 34/02 251/327 |
| 5,275,136 A * | 1/1994 | Schechter | ................ | F01L 9/10 251/47 |
| 6,067,946 A * | 5/2000 | Bunker | ..................... | F01L 9/10 123/90.12 |
| 6,311,714 B1 * | 11/2001 | Watanabe | ............... | F16K 17/36 137/38 |
| 7,204,212 B2 * | 4/2007 | Donaldson | ............... | F01L 9/10 123/90.27 |
| 2005/0145278 A1 * | 7/2005 | Igawa | ................. | F16K 31/1268 137/486 |
| 2009/0283155 A1 * | 11/2009 | Yoshino | .............. | F16K 31/1264 137/487.5 |

(Continued)

FOREIGN PATENT DOCUMENTS

JP 2004-162814 A 6/2004

*Primary Examiner* — Kevin F Murphy
*Assistant Examiner* — Jonathan J Waddy
(74) *Attorney, Agent, or Firm* — Pearne & Gordon LLP

(57) ABSTRACT

A temperature control fluid is introduced through a first port. The temperature control fluid introduced into the first port is discharged through a second port. A piston is configured to be moved by a pressure to open or close a path connecting the first port and the second port. A pressure control space is provided at at least one side of a moving direction of the piston when the path is opened or closed. Air is supplied into the pressure control space through a third port. A leak portion communicates with the pressure control space, and allows the air supplied into the pressure control space to leak therethrough.

4 Claims, 13 Drawing Sheets

(56) References Cited

U.S. PATENT DOCUMENTS

| | | | |
|---|---|---|---|
| 2013/0248001 A1* | 9/2013 | Young | F16K 3/0254 137/14 |
| 2013/0276892 A1* | 10/2013 | Kamp | F04D 27/0215 137/1 |
| 2015/0204456 A1* | 7/2015 | Adams | F16K 31/1221 251/63.6 |
| 2016/0040798 A1* | 2/2016 | Kunau | F16K 1/126 137/12 |
| 2017/0030473 A1* | 2/2017 | Deaver | F16K 31/122 |
| 2018/0320798 A1* | 11/2018 | McEvoy | F16K 31/122 |
| 2019/0168039 A1* | 6/2019 | Rowe | F16K 17/168 |

* cited by examiner

VALVE DEVICE

CROSS-REFERENCE TO RELATED APPLICATION

This application claims the benefit of Japanese Patent Application No. 2020-029078 filed on Feb. 25, 2020, the entire disclosure of which is incorporated herein by reference.

TECHNICAL FIELD

The various aspects and embodiments described herein pertain generally to a valve device.

BACKGROUND

Patent Document 1 describes a valve device configured to move a piston rod by a pressure of supplied air to thereby switch opening/closing of a path which connects an inlet port and an outlet port.

Patent Document 1: Japanese Patent Laid-open Publication No. 2004-162814

SUMMARY

In one exemplary embodiment, a valve device includes a first port, a second port, a piston, a pressure control space, a third port and a leak portion. A temperature control fluid is introduced through the first port. The temperature control fluid introduced into the first port is discharged through the second port. The piston is configured to be moved by a pressure to open or close a path connecting the first port and the second port. The pressure control space is provided at at least one side of a moving direction of the piston when the path is opened or closed. Air is supplied into the pressure control space through the third port. The leak portion communicates with the pressure control space, and allows the air supplied into the pressure control space to leak therethrough.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
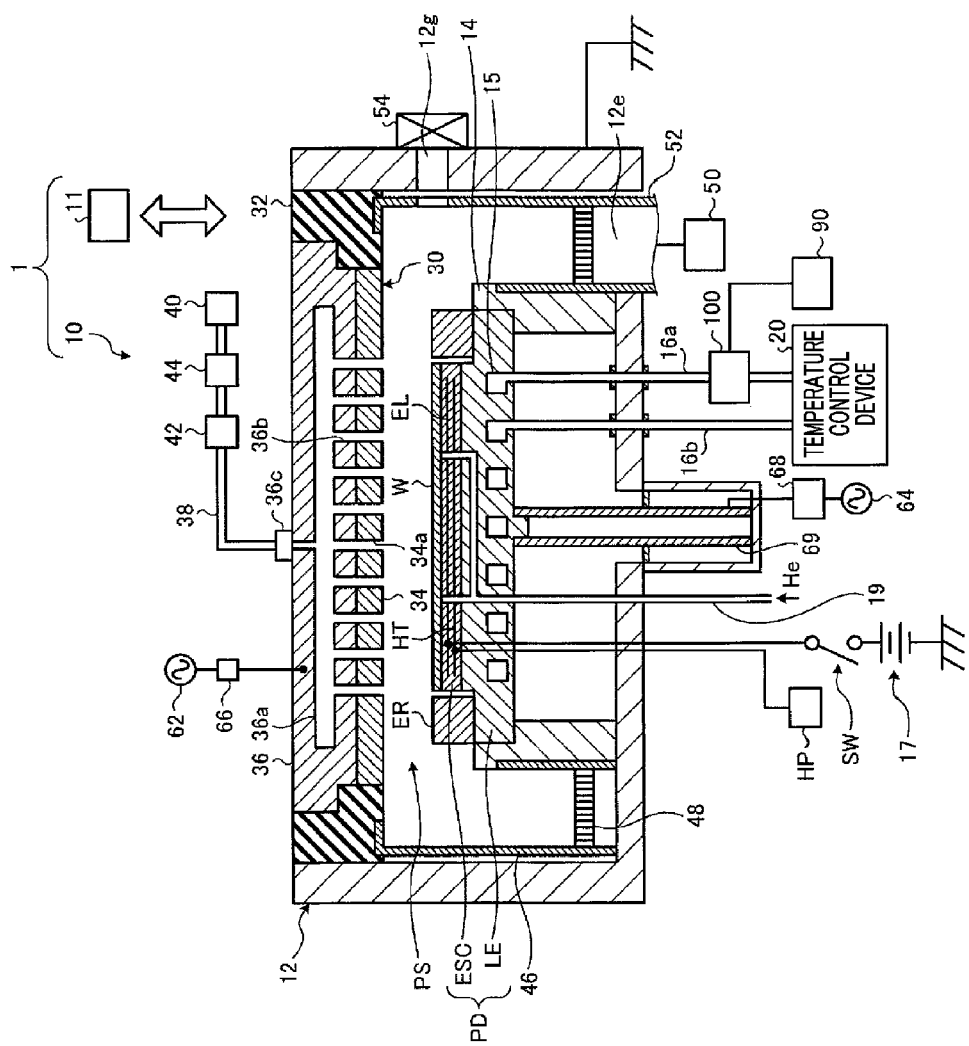
FIG. 1 is a schematic cross sectional view illustrating an example of a plasma processing apparatus according to an exemplary embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Hereinafter, exemplary embodiments of a valve device according to the present disclosure will be described in detail with reference to the accompanying drawings. Further, it should be noted that the valve device of the present disclosure is not limited by the exemplary embodiments.

Conventionally, there is known a technique of controlling a temperature by circulating a temperature control fluid. For example, in a substrate processing apparatus, a temperature of a substrate is controlled via a stage by circulating a temperature control fluid in the stage on which the substrate is placed. In this substrate processing apparatus, a substrate processing may be performed in the state that the substrate is cooled to a low temperature by circulating the temperature control fluid cooled to a low temperature (e.g., −20° C. or less) in the stage. If a flow rate control for this temperature control fluid of the low temperature is performed by using a valve device such as an air operate valve which is configured to be capable of switching opening/closing thereof by a pressure of supplied air, the valve device may cause a problem. By way of example, the valve device may be cooled by the temperature control fluid, and moisture contained in the supplied air may be condensed or frozen, resulting in a problem. Further, if the valve device discharges cooled air, there is a concern that condensation or freezing may occur at a portion to which the cooled air is discharged, causing a problem as well.

Further, though the problem that might be caused when the valve device is cooled by the temperature control fluid is mentioned above, a problem may also be caused when the valve device is heated by the heated temperature control fluid. For example, if the valve device discharges heated air, there is a concern that a burn or a high-temperature degradation of a component may be caused at a portion to which the heated air is discharged.

Thus, there is a demand for a technique capable of suppressing a problem that might be caused by an influence from a temperature of the temperature control fluid.

Now, an exemplary embodiment will be discussed. This exemplary embodiment will be described for an example where a valve device configured to be capable of switching opening/closing thereof by a pressure of supplied air is provided in a substrate processing apparatus. In the following, a plasma processing apparatus will be described as an example of the substrate processing apparatus. In the present exemplary embodiment, the description will be provided for an example where the plasma processing apparatus performs a plasma etching on a substrate as a plasma processing. A wafer is described as an example of the substrate.

[Configuration of Plasma Processing Apparatus 1]

FIG. 1 is a schematic cross sectional view illustrating an example of a plasma processing apparatus 1 according to the exemplary embodiment. In the present exemplary embodiment, the plasma processing apparatus 1 is a plasma etching apparatus equipped with, for example, a parallel plate electrode. The plasma processing apparatus 1 includes an apparatus main body 10 and a control device 11. The apparatus main body 10 has a processing vessel 12 which is made of a material such as, but not limited to, aluminum and has, for example, a substantially cylindrical shape. An inner wall surface of this processing vessel 12 is anodically oxidized. Further, the processing vessel 12 is frame-grounded.

A substantially cylindrical supporting member 14 made of an insulating material such as, but not limited to, quartz is provided on a bottom of the processing vessel 12. Within the processing vessel 12, the supporting member 14 is extended vertically upwards (for example, toward a direction of an upper electrode 30) from the bottom of the processing vessel 12.

A stage PD is provided within the processing vessel 12. The stage PD is supported by the supporting member 14. The stage PD holds a wafer W on a top surface thereof. The stage PD has an electrostatic chuck ESC and a lower electrode LE. The lower electrode LE is made of a metal material such as, but not limited to, aluminum, and has a substantially disk shape. The electrostatic chuck ESC is disposed on the lower electrode LE.

The electrostatic chuck ESC has a structure in which an electrode EL made of a conductive film is embedded between a pair of insulating layers or insulating sheets. The electrode EL is electrically connected with a DC power supply 17 via a switch SW. The electrostatic chuck ESC is configured to attract the wafer W on a top surface thereof by an electrostatic force such as a Coulomb force generated by a DC voltage supplied from the DC power supply 17. Accordingly, the electrostatic chuck ESC is capable of holding the wafer W.

A heat transfer gas such as, but not limited to, a He gas is supplied into the electrostatic chuck ESC through a pipeline 19. The heat transfer gas supplied through the pipeline 19 is supplied into a gap between the electrostatic chuck ESC and the wafer W. By adjusting a pressure of the heat transfer gas supplied into the gap between the electrostatic chuck ESC and the wafer W, thermal conductivity between the electrostatic chuck ESC and the wafer W can be adjusted.

Further, a heater HT as a heating element is provided within the electrostatic chuck ESC. The heater HT is connected with a heater power supply HP. As a power is supplied to the heater HT from the heater power supply HP, the wafer W on the electrostatic chuck ESC can be heated through the electrostatic chuck ESC. A temperature of the wafer W placed on the electrostatic chuck ESC is adjusted by the lower electrode LE and the heater HT. Further, the heater HT may be disposed between the electrostatic chuck ESC and the lower electrode LE.

An edge ring ER is disposed around the electrostatic chuck ESC to surround an edge of the wafer W and the electrostatic chuck ESC. The edge ring ER may also be called a focus ring. The edge ring ER is configured to improve uniformity of a processing upon the wafer W within a surface thereof. The edge ring ER is made of a material, such as quartz, which is appropriately selected based on a material of an etching target film.

Formed within the lower electrode LE is a path 15 through which a temperature control fluid flows. The temperature control fluid may be, by way of non-limiting example, Galden (registered trademark). The path 15 is connected to a temperature control device 20 via a pipeline 16a and a pipeline 16b. The temperature control device 20 controls a temperature of the temperature control fluid flowing in the path 15 of the lower electrode LE. The temperature control fluid having the temperature adjusted by the temperature control device 20 is supplied into the path 15 of the lower electrode LE through the pipeline 16a. The temperature control fluid after flowing in the path 15 is then returned back into the temperature control device 20.

The pipeline 16a is equipped with a valve device 100. The valve device 100 is configured to be capable of switching opening/closing thereof by a pressure of supplied air, thus controlling opening/closing of the pipeline 16a. The valve device 100 is connected to an air supply 90 configured to supply air. The air supply 90 is configured to supply the air to the valve device 100 under the control of the control device 11.

A power feed line 69 for supplying a high frequency power to the lower electrode LE is electrically connected to a bottom surface of the lower electrode LE. The power feed line 69 is made of a metal. Further, though not shown in FIG. 1, a lifter pin for use in delivering the wafer onto/from the electrostatic chuck ESC and a driving device therefor are provided in a space between the lower electrode LE and the bottom of the processing vessel 12.

The power feed line 69 is connected to a first high frequency power supply 64 via a matching device 68. The first high frequency power supply 64 is configured to generate a high frequency power for ion attraction into the wafer W, that is, a high frequency bias power having a frequency ranging from, e.g., 400 kHz to 40.68 MHz, for example, 13.56 MHz. The matching device 68 is a circuit configured to match an output impedance of the first high frequency power supply 64 and an input impedance at a load (lower electrode LE) side. The high frequency bias power generated by the first high frequency power supply 64 is supplied to the lower electrode LE via the matching device 68 and the power feed line 69.

An upper electrode 30 is provided above the stage PD, facing the stage PD. The lower electrode LE and the upper electrode 30 are arranged to be substantially parallel to each other. Plasma is formed in a space between the upper electrode 30 and the lower electrode LE, and a plasma processing such as etching is performed on the wafer W held on the top surface of the electrostatic chuck ESC by the formed plasma. The space between the upper electrode 30 and the lower electrode LE is a processing space PS.

The upper electrode 30 is supported at an upper portion of the processing vessel 12 with an insulating shield member 32 made of, by way of example, quartz therebetween. The upper electrode 30 includes an electrode plate 34 and an electrode supporting body 36. A bottom surface of the electrode plate 34 is in direct contact with the processing space PS. The electrode plate 34 is provided with a multiple number of gas discharge holes 34a. The electrode plate 34 is made of, by way of example, a material including silicon.

The electrode supporting body 36 is made of a conductive material such as, but not limited to, aluminum and configured to support the electrode plate 34 in a detachable manner. The electrode supporting body 36 may have a non-illustrated water-cooling structure. A diffusion space 36a is provided within the electrode supporting body 36. A multiple number of gas holes 36b are extended downwards (towards the stage PD) from the diffusion space 36a to communicate with the gas discharge holes 34a of the electrode plate 34, respectively. The electrode supporting body 36 is provided with a gas inlet port 36c through which a processing gas is introduced into the diffusion space 36a, and a pipeline 38 is connected to the gas inlet port 36c.

The pipeline 38 is connected to a gas source group 40 via a valve group 42 and a flow rate controller group 44. The gas source group 40 includes a plurality of gas sources. The valve group 42 includes a plurality of valves, and the flow rate controller group 44 includes a plurality of flow rate controllers such as mass flow controllers. Each of the gas sources belonging to the gas source group 40 is connected to the pipeline 38 via a corresponding valve belonging to the valve group 42 and a corresponding flow rate controller belonging to the flow rate controller group 44.

With this configuration, the apparatus main body 10 is capable of supplying the processing gas from one or more gas sources selected from the gas source group 40 into the diffusion space 36a of the electrode supporting body 36 at individually controlled flow rates. The processing gas supplied into the diffusion space 36a is diffused within the diffusion space 36a and then supplied into the processing space PS through the gas holes 36b and the gas discharge holes 34a in a shower shape.

The electrode supporting body 36 is connected with a second high frequency power supply 62 via a matching device 66. The second high frequency power supply 62 is configured to generate a high frequency power for plasma formation having a frequency ranging from, e.g., 27 MHz to 100 MHz, for example, 60 MHz. The matching device 66 is a circuit configured to match an output impedance of the second high frequency power supply 62 and an input impedance at a load (upper electrode 30) side. The high frequency power generated by the second high frequency power supply 62 is supplied to the upper electrode 30 via the matching device 66. The second high frequency power supply 62 may be connected to the lower electrode LE via the matching device 66.

A deposition shield 46 made of, for example, aluminum a surface of which is coated with a $Y_2O_3$, quartz or the like is provided on the inner wall surface of the processing vessel 12 and an outer side surface of the supporting member 14 in a detachable manner. The deposition shield 46 is configured to suppress an etching byproduct (deposit) from adhering to the processing vessel 12 and the supporting member 14.

At a bottom side of the processing vessel 12 (where the supporting member 14 is provided), a gas exhaust plate 48 made of, for example, aluminum a surface of which is coated with a $Y_2O_3$, quartz or the like is provided between the outer side surface of the supporting member 14 and an inner sidewall of the processing vessel 12. A gas exhaust opening 12e is provided under the gas exhaust plate 48. The gas exhaust opening 12e is connected with a gas exhaust device 50 via a gas exhaust line 52.

The gas exhaust device 50 has a vacuum pump such as a turbo molecular pump, and is thus capable of decompressing the space within the processing vessel 12 to a required vacuum level. An opening 12g through which the wafer W is carried in or out is provided at the sidewall of the processing vessel 12, and the opening 12g is opened or closed by a gate valve 54.

The control device 11 includes a processor, a memory and an input/output interface. The memory stores therein programs to be executed by the processor and recipes including conditions for various kinds of processings and the like. The processor executes the programs read out from the memory and controls the individual components of the apparatus main body 10 via the input/output interface based on the recipes stored in the memory, thus allowing a preset processing such as etching to be performed on the wafer W.

The plasma processing apparatus 1 performs the plasma etching after cooling the wafer W to a low temperature. The temperature control device 20 cools the temperature control fluid to a low temperature (e.g., −20° C. or less), and cools the wafer W to the low temperature by circulating the cooled temperature control fluid in the stage PD.

If, however, a flow rate control of this temperature control fluid having the low temperature is performed by the valve device 100 which is configured to be capable of switching the opening/closing thereof by the supplied air, the valve device 100 may cause a problem. By way of example, the valve device 100 may be cooled by the temperature control fluid, and moisture contained in the supplied air may be condensed. If the temperature further decreases, the condensed moisture may be frozen, causing a problem.

To solve the problem, in the present exemplary embodiment, the valve device 100 is configured as will be described below.

[Configuration of Valve Device 100]

Figure 2:
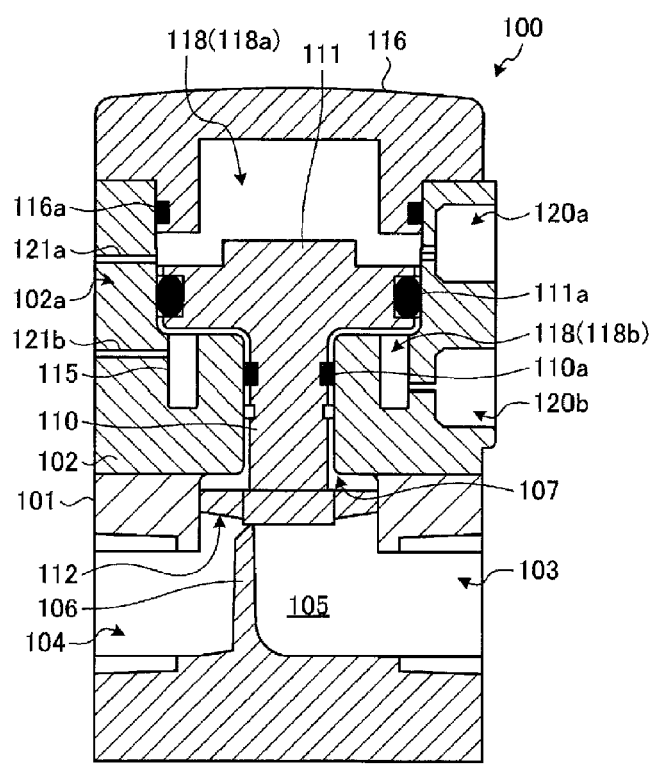
FIG. 2 is a schematic cross sectional view illustrating a valve device according to the exemplary embodiment.

FIG. 2 is a schematic cross sectional view illustrating an example of the valve device 100 according to the exemplary embodiment. The valve device 100 has a valve box 101 and a valve sheet 102. An inlet port 103 and an outlet port 104 are provided at lateral sides of the valve box 101, and a path 105 connecting the inlet port 103 and the outlet port 104 is provided within the valve box 101. The inlet port 103 is connected to the temperature control device 20 via a non-illustrated pipeline, and the cooled temperature control fluid is introduced into this inlet port 103. The outlet port 104 is connected to the path 15 of the lower electrode LE via a non-illustrated pipeline, and the temperature control fluid introduced into the inlet port 103 is drawn out through this outlet port 104. In the valve box 101, a protrusion 106 is formed at a bottom surface of the path 105, and this protrusion 106 makes the path 105 gently curved. Further, in the valve box 101, an opening 107 is formed at a top surface of the path 105 near the curved portion thereof. The valve sheet 102 is bonded to the valve box 101 to close the opening 107 of the valve box 101. The valve sheet 102 supports a circular column-shaped piston 110 while allowing the piston 110 to be vertically movable.

The piston 110 has a head 111 at an upper portion thereof and a valve main body 112 at a lower portion thereof. The head 111 is formed to have a circular plate shape having a diameter larger than a diameter of a central portion of the piston 110. The valve sheet 102 has a recess 115 formed on a surface thereof which is positioned under the head 111, and this recess 115 is formed along a circumferential direction. Further, the valve sheet 102 has a cylindrical housing member 102a formed at an upper side thereof to surround a lateral side of the head 111 of the piston 110. A top surface of the housing member 102a is hermetically sealed by a cover 116.

In the valve device 100, a pressure control space 118 is provided at at least one side of a moving direction of the piston 110. For example, in the valve device 100 shown in FIG. 2, a pressure control space 118a is formed above the piston 110, and a pressure control space 118b is formed under the piston 110.

The pressure control space 118a is formed by a top surface of the piston 110, an inner side surface of the housing member 102a and a bottom surface of the cover 116. A sealing member 111a such as a seal is provided at a circumferential surface of the head 111 facing the housing member 102a along the entire circumference thereof. A contact portion between the head 111 and the housing member 102a is sealed by the sealing member 111a. Further, a sealing member 116a such as a seal is provided at a circumferential surface of the cover 116 facing the housing member 102a along the entire circumference thereof. A contact portion between the cover 116 and the housing member 102a is hermetically sealed by the sealing member 116a. The pressure control space 118a is hermetically sealed by the sealing members 111a and 116a.

The pressure control space 118b is formed by the recess 115 of the valve sheet 102, the top surface of the piston 110 and the inner side surface of the housing member 102a. A sealing member 110a such as a seal is provided at a circumferential surface of a substantially central portion of the piston 110 facing the valve sheet 102 along the entire circumference thereof. A contact portion between the piston 110 and the valve sheet 102 is hermetically sealed by the sealing member 110a. The pressure control space 118b is hermetically sealed by the sealing members 110a and 111a.

The valve sheet 102 has two air inlet ports 120a and 120b provided at a lateral side thereof. The air inlet port 120a communicates with the pressure control space 118a, and the air inlet port 120b communicates with the pressure control space 118b.

The cooled temperature control fluid is supplied into the inlet port 103 from the temperature control device 20. The valve device 100 according to the exemplary embodiment switches the opening/closing of the path 105 by supplying air from the air supply 90 into the air inlet ports 120a and 120b, thus controlling the flow of the temperature control fluid.

Figure 3:
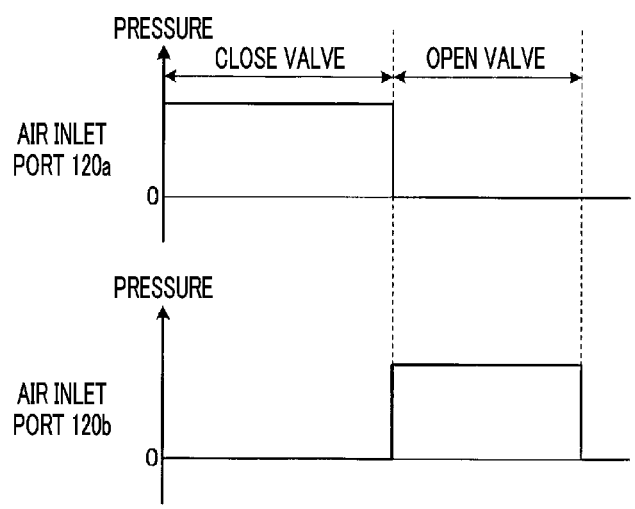
FIG. 3 is a diagram illustrating an example of a pressure of air supplied into an air inlet port when the valve device according to the exemplary embodiment is opened or closed.

FIG. 3 is a diagram illustrating a pressure of the air supplied into the air inlet ports 120a and 120b when the valve device 100 according to the exemplary embodiment is opened or closed. The air supply 90 supplies the air into the air inlet port 120a to set the valve device 100 to be in a closed state, whereas the air supply 90 supplies the air into the air inlet port 120b to set the valve device 100 to be in an open state.

In the valve device 100 according to the exemplary embodiment, if the air is supplied into the air inlet port 120a, a pressure within the pressure control space 118a increases, and the piston 110 is moved downwards by an effect of the pressure within the pressure control space 118a. As a result, the valve sheet 102 closes the path 105, turning the valve device 100 into the closed state. Meanwhile, in the valve device 100 according to the exemplary embodiment, if the air is supplied to the air inlet port 120b, a pressure within the pressure control space 118b increases, and the piston 110 is moved upwards by an effect of the pressure within the pressure control space 118b. As a result, the path 105 is opened. When the valve device 100 is in the closed state, the temperature control fluid cannot pass through the path 105. When the valve device 100 is in the open state, on the other hand, the temperature control fluid passes through the path 105. FIG. 2 illustrates the closed state.

Further, though FIG. 3 illustrates the example where the opening/closing of the valve device 100 is switched by supplying the air to either one of the air inlet ports 120a and 120b selectively. However, the air may be slightly supplied to the other of the air inlet ports 120a and 120b at the same time. By way of example, when the valve device 100 needs to be turned into the closed state, the air supply 90 may supply to the air inlet port 120b the air having a pressure low enough not to affect the movement of the piston 110 while supplying to the air inlet port 120a the air having a pressure high enough to push the piston 110 downwards.

However, the valve device 100 may be cooled by the temperature control fluid, and moisture contained in the supplied air may be condensed, and the condensed moisture may be frozen if the temperature further decreases, resulting in a problem.

To solve the problem, in the valve device 100 according to the exemplary embodiment, there are provided leak portions through which the air supplied into the pressure control spaces 118a and 118b is allowed to leak. For example, in the valve device 100 according to the exemplary embodiment, a through hole 121a communicating with the pressure control space 118a and a through hole 121b communicating with the pressure control space 118b are formed at the housing member 102a as the leak portions. The through hole 121a allows the air supplied into the pressure control space 118a to leak to the outside therethrough, and the through hole 121b allows the air supplied into the pressure control space 118b to leak to the outside therethrough.

The through hole 121a may be provided at any position of the housing member 102a. Desirably, however, the through hole 121a may be provided at an opposite side from the air inlet port 120a with respect to the pressure control space 118a therebetween. Likewise, though the through hole 121b may be provided at any position of the housing member 102a, it is desirable that the through hole 121b is provided at an opposite side from the air inlet port 120b with the pressure control space 118b therebetween. In FIG. 2, the through hole 121a is provided at the opposite side from the air inlet port 120a with respect to the pressure control space 118a, and the through hole 121b is provided at the opposite side from the air inlet port 120b with respect to the pressure control space 118b.

In the valve device 100, however, if a leak amount of the air from the through holes 121a and 121b is large, the pressures within the pressure control spaces 118a and 118b may not be increased to a pressure level allowing the piston 110 to be moved. In such a case, the opening/closing of the valve device 100 cannot be carried out. For the reason, the through holes 121*a* and 121*b* are formed to allow the leak amount not to affect the movement of the piston 110. By forming the through holes 121*a* and 121*b* to have a small diameter, the leak amount can be set to be small. By way of example, the through holes 121*a* and 121*b* are formed to have a diameter equal to or less than 1 mm. When the air having a pressure larger than the pressure causing the piston 110 to be moved is supplied into the air inlet port 120*a*, the through hole 121*a* allows the air in the pressure control space 118*a* to leak therethrough while allowing the pressure within the pressure control space 118*a* to be maintained equal to or larger than the pressure causing the piston 110 to be moved. When the air having a pressure larger than the pressure causing the piston 110 to be moved is supplied into the air inlet port 120*b*, the through hole 121*b* allows the air in the pressure control space 118*b* to leak therethrough while allowing the pressure within the pressure control space 118*b* to be maintained equal to or larger than the pressure causing the piston 110 to be moved.

Figure 4:
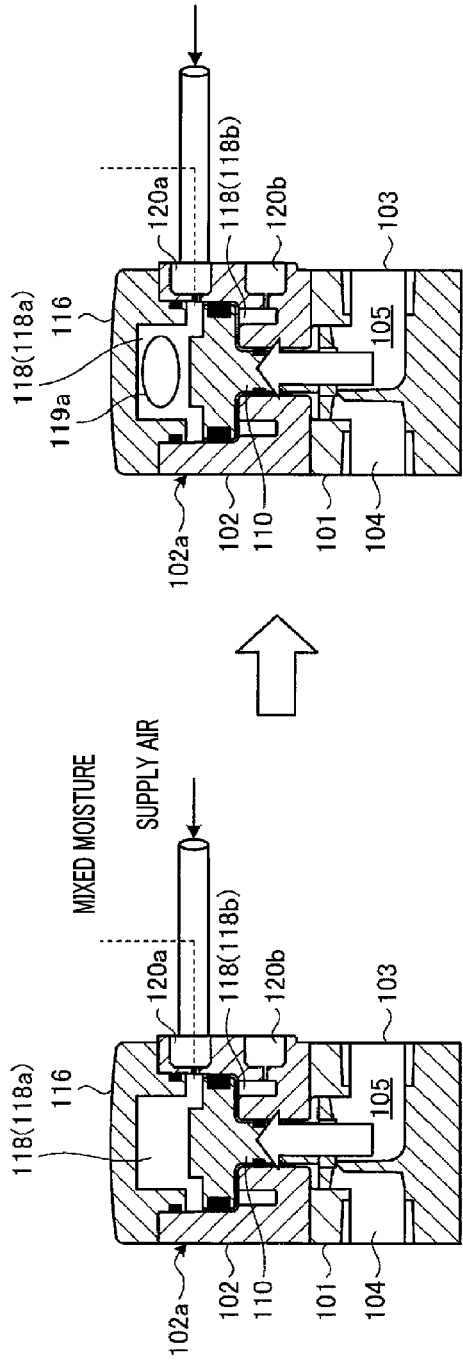
FIG. 4 is a diagram for describing an example of a problem.

Here, an example of the problem that is caused in the absence of the through holes 121*a* and 121*b* will be described. FIG. 4 is a diagram for describing the example of the problem. FIG. 4 illustrates the valve device 100. In this valve device 100, the through holes 121*a* and 121*b* are not provided in the housing member 102*a*. In this configuration, the air stays within the pressure control spaces 118*a* and 118*b*. The air staying therein is cooled by being affected by the cooled temperature control fluid, so that the moisture contained in the air may be cooled and frozen, resulting in the problem. In FIG. 4, a condensation 119*a* of the moisture is illustrated to exist in the pressure control space 118*a*.

Figure 5:
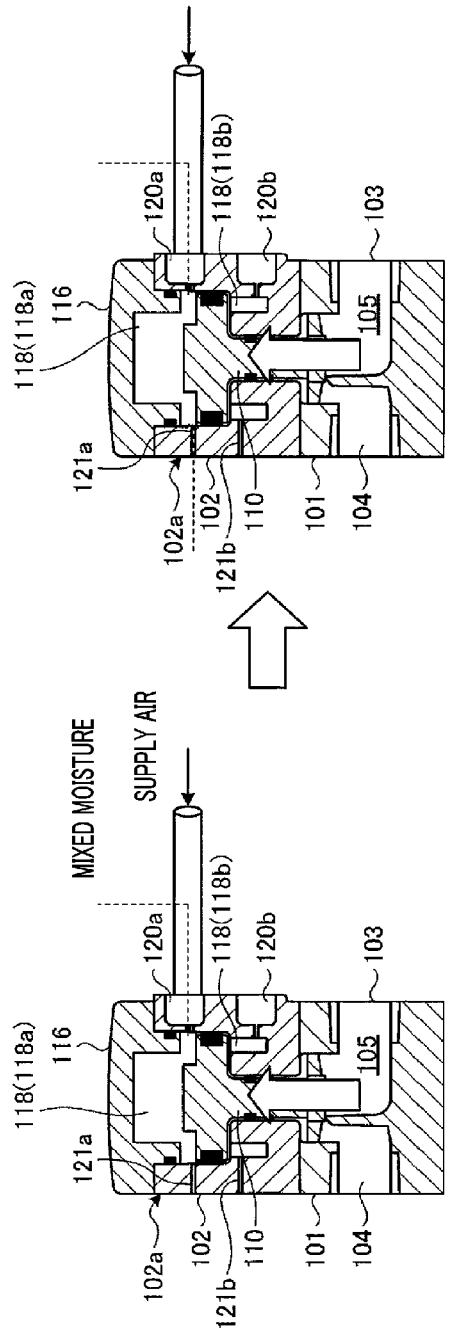
FIG. 5 is a diagram for describing an effect of the exemplary embodiment.

In view of this problem, in the valve device 100 according to the exemplary embodiment, the through holes 121*a* and 121*b* are formed in the housing member 102*a*, and the air supplied into the pressure control spaces 118*a* and 118*b* are allowed to leak through these through holes 121*a* and 121*b*. FIG. 5 is a diagram for describing an example of an effect of the present exemplary embodiment. FIG. 5 illustrates the valve device 100 according to the present exemplary embodiment. In the valve device 100 according to the present exemplary embodiment, as the air leaks through the through holes 121*a* and 121*b*, the air within the pressure control spaces 118*a* and 118*b* are replaced at all times. Accordingly, even if there is an influence from the temperature of the temperature control fluid, a temperature fluctuation of the air within the pressure control spaces 118*a* and 118*b* can be suppressed, so that the condensation and the freezing can be suppressed. By way of example, by replacing the air within the pressure control spaces 118*a* and 118*b* at all times, the supplied air is discharged at all times even when the moisture is mixed therein. Further, by replacing the air within the pressure control spaces 118*a* and 118*b* at all times, the temperature fluctuation of the air within the pressure control spaces 118*a* and 118*b* can be suppressed, so that the condensation and the freezing can be suppressed. Moreover, since the temperature fluctuation of the air within the pressure control spaces 118*a* and 118*b* is suppressed, the condensation and the freezing can also be suppressed at a place to which the air is discharged.

In addition, in the valve device 100 according to the exemplary embodiment, the through hole 121*a* is provided at the opposite side from the air inlet port 120*a* with the pressure control space 118*a* therebetween, and the through hole 121*b* is provided at the opposite side from the air inlet port 120*b* with the pressure control space 118*b* therebetween. With this configuration, the valve device 100 can create a flow of the air flowing from the air inlet ports 120*a* and 120*b* toward the through holes 121*a* and 121*b* in the pressure control spaces 118*a* and 118*b*, respectively. Thus, the air within the pressure control spaces 118*a* and 118*b* can be replaced efficiently.

Figure 6A:
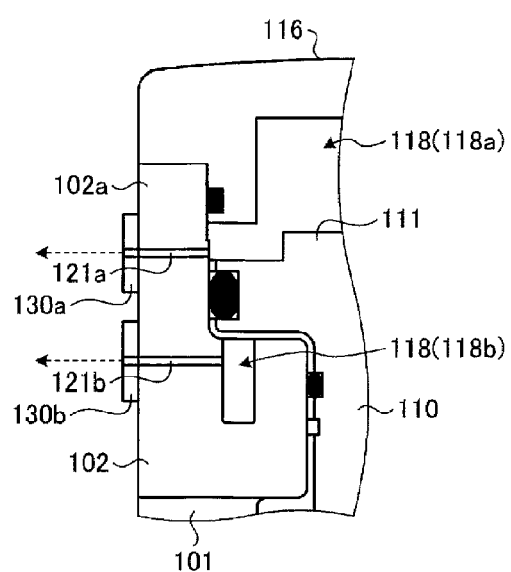
FIG. 6A is a diagram illustrating another example leak portion according to the exemplary embodiment.
Figure 6B:
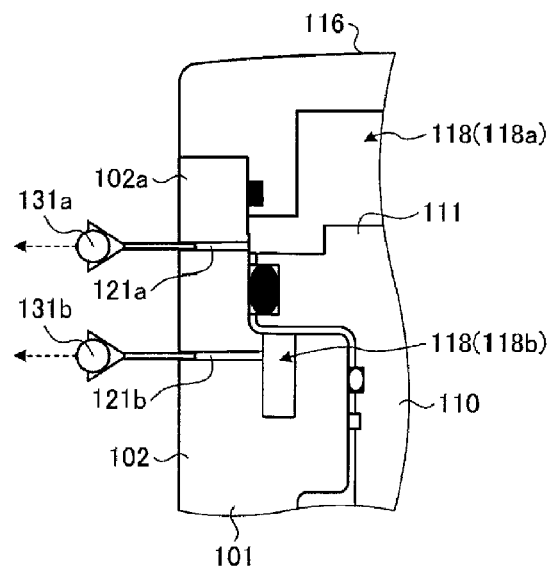
FIG. 6B is a diagram illustrating yet another example leak portion according to the exemplary embodiment.
Figure 6C:
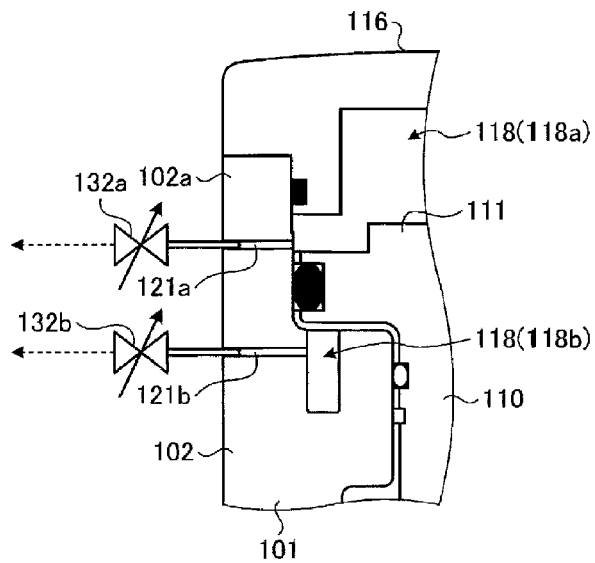
FIG. 6C is a diagram illustrating still yet another example leak portion according to the exemplary embodiment.

The leak amount of the air through the leak portion can be adjusted in other ways without being limited to the aforementioned method of adjusting the diameter of the holes. FIG. 6A is a diagram illustrating another example leak portion according to the exemplary embodiment. In FIG. 6A, orifices 130*a* and 130*b* are provided at the through holes 121*a* and 121*b*, respectively. Each of the orifices 130*a* and 130*b* has a hole, and by adjusting a diameter of this hole, the leak amount can be adjusted. FIG. 6B is a diagram illustrating yet another example leak portion according to the exemplary embodiment. In FIG. 6B, check valves 131*a* and 131*b* are provided at the through holes 121*a* and 121*b*, respectively. Each of the check valves 131*a* and 131*b* is capable of adjusting the leak amount by adjusting an operating pressure at which the valve main body allows the leak. FIG. 6C is a diagram illustrating still yet another example leak portion according to the exemplary embodiment. In FIG. 6C, proportional valves 132*a* and 132*b* are provided at the through holes 121*a* and 121*b*, respectively. Each of the proportional valves 132*a* and 132*b* is capable of adjusting the leak amount by adjusting a degree of openness of a valve main body by using an adjusting screw or the like. Further, since each of the proportional valves 132*a* and 132*b* is capable of adjusting the leak amount by using the adjusting screw or the like, the leak amount can be controlled actively based on the temperature of the air and the moisture amount therein.

Further, in the valve device 100, the pressure control spaces 118*a* and 118*b* are provided at both opposite sides of the moving direction of the piston 110. However, the exemplary embodiment is not limited thereto. In the valve device 100, the pressure control space 118 may be provided at only one side of the moving direction of the piston 110.

Figure 7:
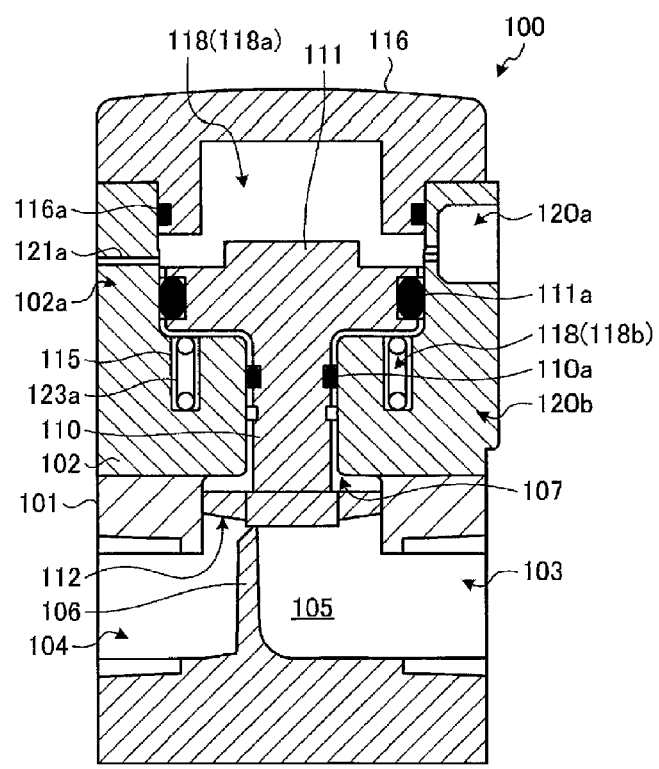
FIG. 7 is a schematic cross sectional view illustrating another example valve device according to the exemplary embodiment.

FIG. 7 is a schematic cross sectional view illustrating another example of the valve device 100 according to the exemplary embodiment. FIG. 7 illustrates a case where the valve device 100 is configured as a normal open type. The valve device 100 shown in FIG. 7 is not provided with the air inlet port 120*b* and the through hole 121*b*. Further, a spring 123*a* is provided in the pressure control space 118*b*. The spring 123*a* is configured to apply a force to the head 111 of the piston 110 in an upward direction. In the state that the air is not supplied to the air inlet port 120*a*, the force is applied from the spring 123*a* to the head 111 in the upward direction, so that the piston 110 is moved upwards. Accordingly, in the state that the air is not supplied, the path 105 of the valve device 100 is in the open state. If the air is supplied to the air inlet port 120*a* in the valve device 100, on the other hand, a pressure within the pressure control space 118*a* increases, so that the piston 110 is moved downwards. Accordingly, the valve sheet 102 closes the path 105, turning the valve device 100 into the closed state. The valve device 100 shown in FIG. 7 has the through hole 121*a* provided in the housing member 102*a*. Accordingly, the air supplied into the pressure control space 118*a* is allowed to leak through the through hole 121*a*. Therefore, even if there is the influence from the temperature of the temperature control fluid, the temperature fluctuation of the air within the pressure control space 118*a* can be suppressed, so that the condensation and the freezing can be suppressed.

Figure 8:
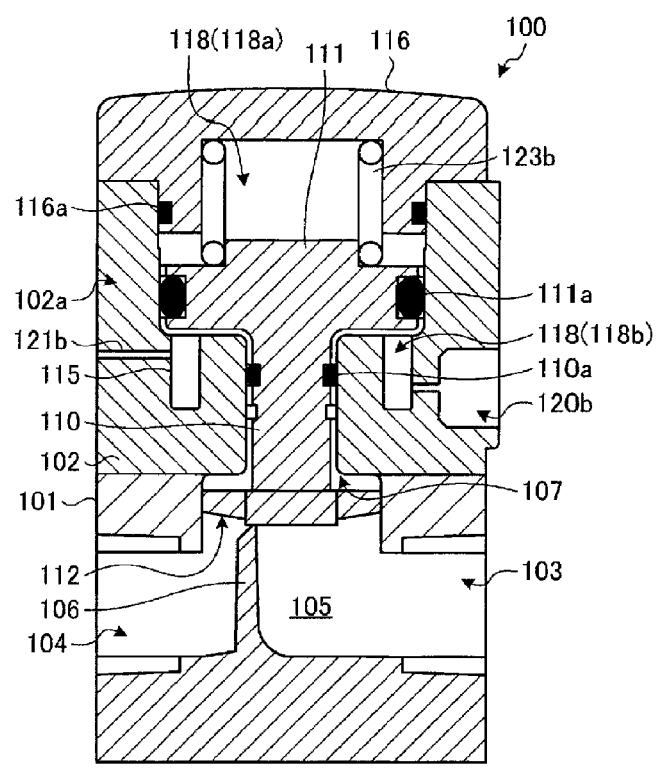
FIG. 8 is a schematic cross sectional view illustrating yet another example valve device according to the exemplary embodiment.

FIG. 8 is a schematic cross sectional view illustrating still yet another example of the valve device 100 according to the exemplary embodiment. FIG. 8 illustrates a case where the valve device 100 is configured as a normal closed type. The valve device 100 shown in FIG. 8 is not provided with the air inlet port 120a and the through hole 121a. Further, a spring 123b is provided in the pressure control space 118a. The spring 123b is configured to apply a force to the head 111 of the piston 110 in a downward direction. In the state that the air is not supplied to the air inlet port 120b, the force is applied from the spring 123b to the head 111 in the downward direction, so that the piston 110 is moved downward. Accordingly, in the state that the air is not supplied, the valve sheet 102 closes the path 105, allowing the valve device 100 to be in the closed state. If the air is supplied to the air inlet port 120b in the valve device 100, on the other hand, a pressure within the pressure control space 118b increases, so that the piston 110 is moved upwards. Accordingly, the path 105 of the valve device 100 is turned into the open state. The valve device 100 shown in FIG. 8 has the through hole 121b provided in the housing member 102a. Accordingly, the air supplied into the pressure control space 118b is allowed to leak through the through hole 121b. Therefore, even if there is the influence from the temperature of the temperature control fluid, the temperature fluctuation of the air within the pressure control space 118b can be suppressed, so that the condensation and the freezing can be suppressed.

Further, in the above-described exemplary embodiment, the problem that may be caused when the valve device 100 is cooled by the temperature control device has been mentioned. However, even when the valve device 100 is heated by the heated temperature control fluid, occurrence of the problem can be suppressed. By way of example, in the valve device 100, the temperature fluctuation of the air in the pressure control spaces 118a and 118b is suppressed. Thus, even if the air is discharged, the occurrence of the problem such as a burn or a high temperature degradation of a component at a place to which the air is discharged can be suppressed.

As stated above, the valve device 100 according to the exemplary embodiment is equipped with the inlet port 103 (first port), the outlet port 104 (second port), the piston 110, the pressure control spaces 118a and 118b, the air inlet ports 120a and 120b (third port), and the through holes 121a and 121b (leak portions). The inlet port 103 introduces the temperature control fluid. The outlet port 104 discharges the temperature control fluid introduced into the inlet port 103. The piston 110 is configured to be moved by the pressure, thus allowing the path 105 connecting the inlet port 103 and the outlet port 104 to be opened or closed. The pressure control spaces 118a and 118b are provided at at least one side of the moving direction of the piston 110 which is moved to open or close the path 105. The third port supplies the air into the pressure control spaces 118a and 118b. The through holes 121a and 121b communicate with the pressure control spaces 118a and 118b, and allow the air supplied into the pressure control spaces 118a and 118b to leak therethrough. Accordingly, in the valve device 100, the occurrence of the problems that may be caused by being affected by the temperature of the temperature control fluid can be suppressed.

Furthermore, when the air having a pressure larger than the pressure causing the piston 110 to be moved is supplied into the air inlet port 120a (120b), the through hole 121a (121b) allows the air in the pressure control space 118a (118b) to leak therethrough, while allowing the pressure within the pressure control space 118a (118b) to be maintained equal to or larger than the pressure causing the piston 110 to be moved. Accordingly, the valve device 100 is capable of suppressing the occurrence of the problems that may be caused by the influence from the temperature of the temperature control fluid while being capable of switching the opening/closing thereof by the air.

Moreover, the pressure control spaces 118a and 118b are provided at both sides of the moving direction of the piston 110. The air inlet ports 120a and 120b and the through holes 121a and 121b are provided in the pressure control spaces 118a and 118b, respectively. With this configuration, the valve device 100 is capable of controlling both the opening and the closing thereof by using the air. Furthermore, even when the valve device 100 is configured to be capable of controlling both the opening and the closing thereof by the air, the occurrence of the problems that may be caused by being affected by the temperature of the temperature control fluid can still be suppressed.

In addition, the through holes 121a and 121b are provided at the opposite sides from the air inlet ports 120a and 120b with respect to the pressure control spaces 118a and 118b, respectively. With this configuration, the valve device 100 is capable of replacing the air within the pressure control spaces 118a and 118b efficiently.

Moreover, one of the orifice 130a (130b), the check valve 131a (131b) and the proportional valve 132a (132b) is provided at the through hole 121a (121b). With this configuration, the valve device 100 is capable of adjusting the leak amount.

So far, the exemplary embodiment has been described. However, it should be noted that the exemplary embodiment is illustrative in all aspects and is not anyway limiting. In fact, the above-described exemplary embodiment can be embodied in various forms. Further, the above-described exemplary embodiment may be omitted, replaced and modified in various ways without departing from the scope and the spirit of claims.

By way of example, the above exemplary embodiment has been described for the example where the one through hole 121a (121b) is provided in the pressure control space 118a (118b). However, the exemplary embodiment is not limited thereto. That is, in the valve device 100, a multiple number of through holes 121a (121b) may be provided in the pressure control space 118a (118b).

Figure 9:
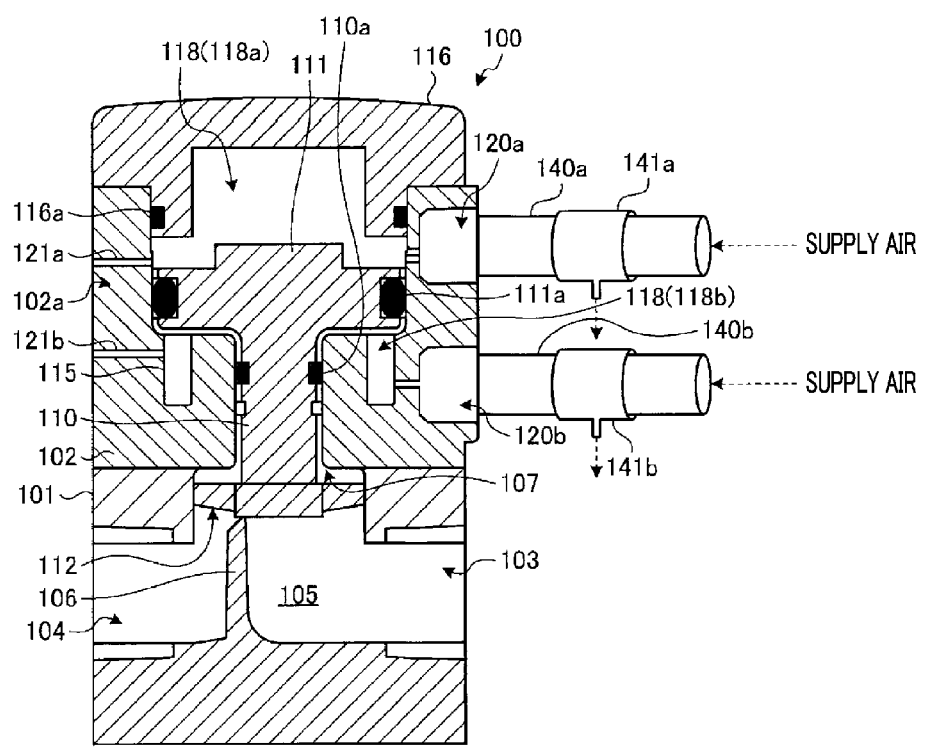
FIG. 9 is a diagram for describing another exemplary embodiment.

Further, in the above-described exemplary embodiment, by providing the through hole 121a (121b) in the housing member 102a, the air supplied into the pressure control space 118a (118b) is intentionally made to leak to thereby suppress the occurrence of the problems. However, the exemplary embodiment is not limited thereto. The inventive concept of the present disclosure may be applied to something else. For instance, the inventive concept of the present disclosure may be applied to a pipeline through which the air is supplied to the valve device 100. FIG. 9 is a diagram illustrating an example of another exemplary embodiment. A valve device 100 shown in FIG. 9 is equipped with a pipeline 140a through which the air is supplied to the air inlet port 120a; and a pipeline 140b through which the air is supplied to the air inlet port 120b. Each of the pipelines 140a and 140b is provided with a leak portion through which the supplied air leaks. For example, the pipeline 140a has a branch line 141a as the leak portion, and the pipeline 140b has a branch line 141b as the leak portion. The branch line 141a allows the air supplied into the pipeline 140a to leak to the outside. The branch line 141b allows the air supplied into the pipeline 140b to leak to the outside. By setting at least a part of the branch line 141a (141b) to have a small inner diameter, or by disposing a filler within the branch line 141*a* (141*b*) to reduce a region of the branch line 141*a* (141*b*) through which the air passes, the leak amount can be reduced.

Figure 10:
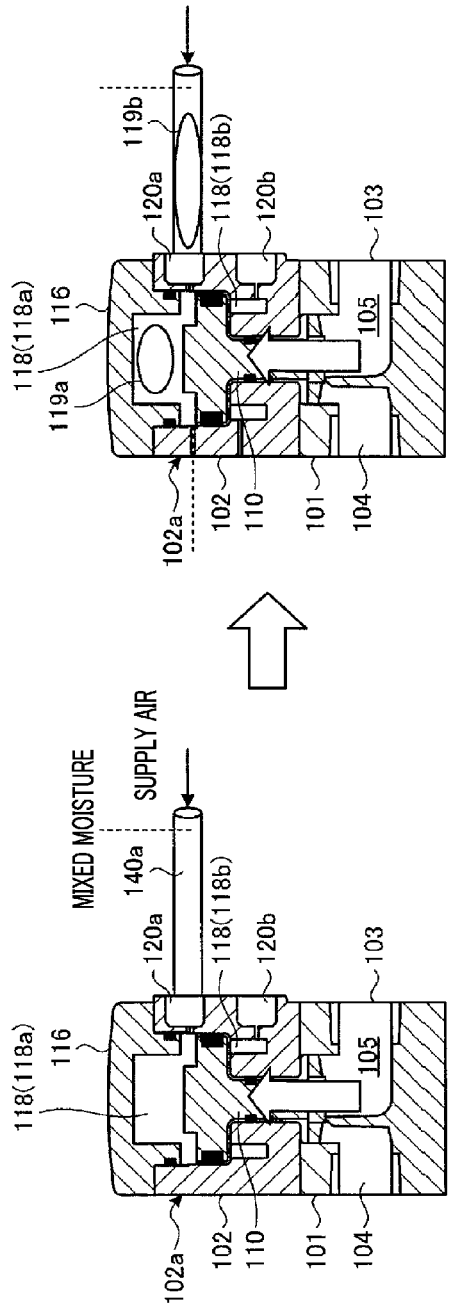
FIG. 10 is a diagram for describing an example of a problem.

Here, an example of a problem that may be caused when the branch lines 141*a* and 141*b* are not provided will be explained. FIG. 10 is a diagram for describing the example of the problem. FIG. 10 illustrates a valve device 100. In this valve device 100, the pipeline 140*a* (140*b*) does not have the branch line 141*a* (141*b*). In this configuration, when the air is not supplied to the air inlet port 120*a* (120*b*), the air stays within the pipeline 140*a* (140*b*). In such a case, there is a concern that the air staying therein is cooled by being affected by the cooled temperature control fluid, resulting in the condensation or the freezing of moisture included in the air. In FIG. 10, a condensation 119*b* of the moisture in the pipeline 140*a* is illustrated. If the air is supplied, this condensation 119*b* is introduced into the pressure control space 118*a* (118*b*) as the air flows. FIG. 4 shows the condensation 119*a* within the pressure control space 118*a*.

Figure 11:
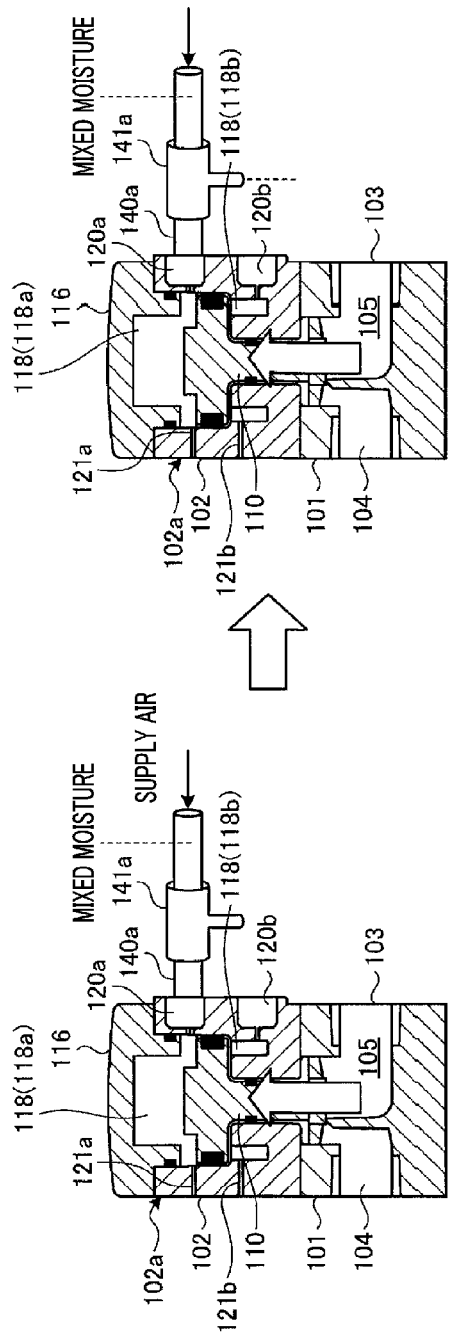
FIG. 11 is a diagram for describing an effect of the another exemplary embodiment.

As a resolution, in the valve device 100 according to the another exemplary embodiment, the pipeline 140*a* (140*b*) is provided with the branch line 141*a* (141*b*) to thereby allow the air supplied into the pipeline 140*a* (140*b*) to leak to the outside. FIG. 11 is a diagram for describing an effect of this another exemplary embodiment. FIG. 11 illustrates the valve device 100 according to the another exemplary embodiment. In the valve device 100, as the air leaks through the branch lines 141*a* and 141*b*, the air within the pipelines 140*a* and 140*b* is replaced at all times. Accordingly, even if there is the influence from the temperature of the temperature control fluid, the temperature fluctuation of the air within the pipelines 140*a* and 140*b* can be suppressed, so that the condensation and the freezing can be suppressed.

Figure 12A:
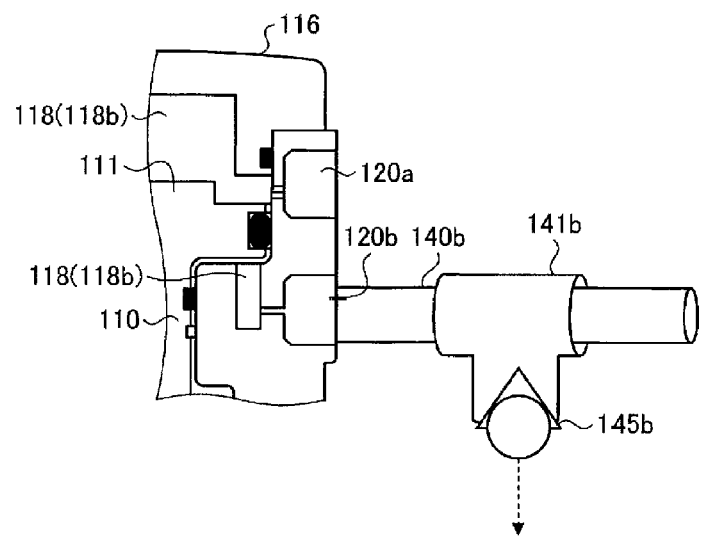
FIG. 12A is a diagram illustrating another example leak portion according to the another exemplary embodiment.
Figure 12B:
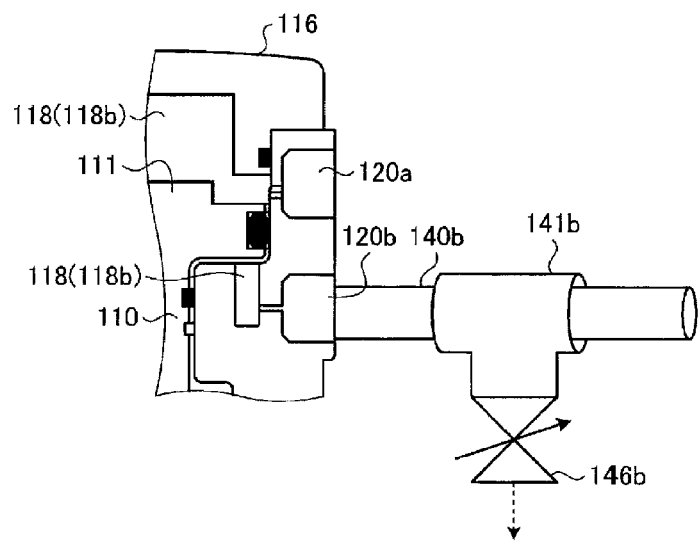
FIG. 12B is a diagram illustrating yet another example leak portion according to the another exemplary embodiment.

The branch lines 141*a* and 141*b* may be configured to be capable of adjusting the leak amount through a mechanism other than the aforementioned method of adjusting the diameter of the branch lines 141*a* and 141*b* or putting the filler therein. FIG. 12A is a diagram illustrating another example leak portion according to the another exemplary embodiment. In FIG. 12A, a check valve 145*b* is provided at the branch line 141*b*. The check valve 145*b* is capable of adjusting the leak amount by adjusting the operating pressure at which a valve main body allows the leak. FIG. 12B is a diagram illustrating yet another example leak portion according to the another exemplary embodiment. In FIG. 12B, a proportional valve 146*b* is provided at the branch line 141*b*. The proportional valve 146*b* is capable of adjusting the leak amount by adjusting a degree of openness of the valve main body by using an adjusting screw or the like. Further, since the proportional valve 146*b* is capable of adjusting the leak amount by using the adjusting screw or the like, the leak amount can be controlled actively based on the temperature of the air and the moisture amount therein.

The inventive concept of the present disclosure can be applied to various kinds of plasma processing apparatuses. By way of example, the plasma processing apparatus 1 may be any of various types such as an inductively coupled plasma processing apparatus and a plasma processing apparatus configured to excite a gas by a surface wave such as a microwave.

Further, in the above-described exemplary embodiments, the plasma etching apparatus is described as the example of the plasma processing apparatus 1. However, the present disclosure is not limited thereto. The present disclosure can also be applied to any of various other kinds of apparatuses such as a film forming apparatus, a modifying apparatus and a cleaning apparatus as long as they control a temperature of a temperature target object such as a wafer W by using a temperature-controlled temperature control fluid.

The above-described exemplary embodiments are illustrative in all aspects and are not anyway limiting. In fact, the above-described exemplary embodiments can be embodied in various forms. Further, the above-described exemplary embodiments may be omitted, replaced and modified in various ways without departing from the scope and the spirit of claims.

According to the exemplary embodiment, it is possible to suppress the problem that might be caused by being affected by the temperature of the temperature control fluid.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting. The scope of the inventive concept is defined by the following claims and their equivalents rather than by the detailed description of the exemplary embodiments. It shall be understood that all modifications and embodiments conceived from the meaning and scope of the claims and their equivalents are included in the scope of the inventive concept.

We claim:

1. A valve device, comprising:
   a first port through which a temperature control fluid is introduced;
   a second port through which the temperature control fluid introduced into the first port is discharged;
   a piston configured to be moved by a pressure to open or close a path connecting the first port and the second port;
   a first pressure control space provided at a first side of a moving direction of the piston when the path is opened or closed;
   a first air inlet port through which air is supplied into the first pressure control space;
   a first leak portion communicating with the first pressure control space, and allowing the air supplied into the first pressure control space to leak therethrough;
   a second pressure control space provided at a second side of the moving direction of the piston;
   a second leak portion communicating with the second pressure control space; and
   a second air inlet port through which air is supplied into the second pressure control space; and
   an air supply pipeline to supply the air to the first air inlet port, the air supply pipeline having a pipeline leak portion, through which the air leaks to an outside,
   wherein the first leak portion is provided at a side of the first pressure control space opposite from a side on which the first air inlet port is provided,
   a diameter of the first leak portion is smaller than a diameter of the first air inlet port, and
   wherein the first leak portion and the second leak portion are always open to the atmosphere regardless of air supplied into the first pressure control space.

2. The valve device of claim 1,
   wherein when the air having a pressure larger than a pressure causing the piston to be moved is supplied into the first air inlet port, the first leak portion allows the air in the first pressure control space to leak therethrough while allowing a pressure within the first pressure control space to be maintained equal to or larger than the pressure causing the piston to be moved.

3. The valve device of claim 1,
wherein at least one of the first leak portion and the second leak portion is provided with an orifice.

4. A valve device, comprising:
a first port through which a temperature control fluid is introduced;
a second port through which the temperature control fluid introduced into the first port is discharged;
a piston configured to be moved by a pressure to open or close a path connecting the first port and the second port;
a first pressure control space provided at a first side of a moving direction of the piston when the path is opened or closed;
a first air inlet port through which air is supplied into the first pressure control space;
a first leak portion communicating with the first pressure control space, and allowing the air supplied into the first pressure control space to leak therethrough;
a second pressure control space provided at a second side of the moving direction of the piston;
a second leak portion communicating with the second pressure control space; and
a second air inlet port through which air is supplied into the second pressure control space,
wherein the first leak portion is provided at a side of the first pressure control space opposite from a side on which the first air inlet port is provided, and
wherein the first leak portion and the second leak portion are always open to the atmosphere regardless of air supplied into the first pressure control space.

* * * * *